Nov. 16, 1965  J. A. ACCIARRI ET AL  3,218,343
PURIFICATION OF ALUMINUM ALKYLS
Filed Oct. 10, 1962
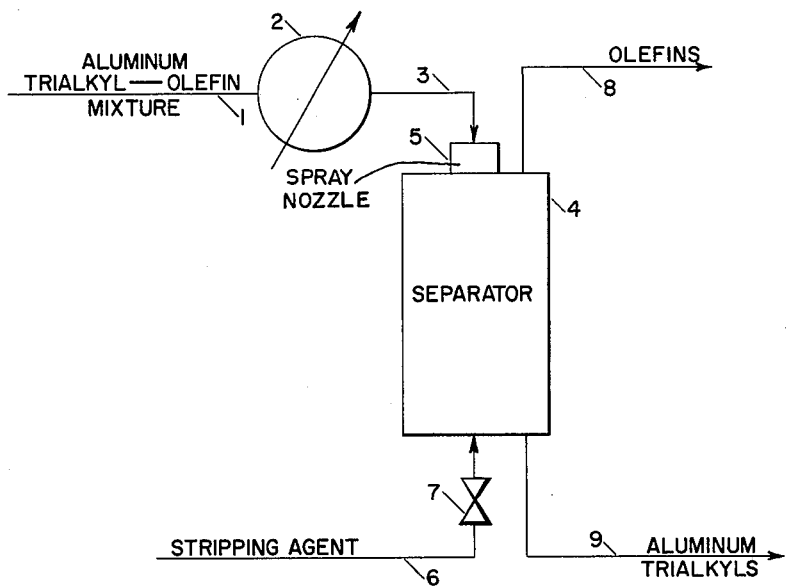
INVENTORS
JERRY A. ACCIARRI
WILLIAM B. CARTER
BY
William A. Mikesell Jr.
ATTORNEY

United States Patent Office 3,218,343
Patented Nov. 16, 1965

3,218,343
PURIFICATION OF ALUMINUM ALKYLS
Jerry A. Acciarri and William B. Carter, Ponca City,
Okla., assignors to Continental Oil Company, Ponca
City, Okla., a corporation of Delaware
Filed Oct. 10, 1962, Ser. No. 229,729
4 Claims. (Cl. 260—448)

This invention relates to an improved system for the separation of alpha-olefins from liquid mixtures containing aluminum trialkyls, and more particularly the present invention is also concerned with the separation of alpha-olefins from a liquid mixture including aluminum trialkyls which are to be used for the manufacture of alcohols.

It is well-known that a low molecular weight aluminum trialkyl can be reacted with a low molecular weight alkylene to produce a growth product containing aluminum trialkyl having alkyl substituents of high molecular weight. In the reaction, alpha-olefin is also produced as a by-product, which can be valuable if it can be separated in an economical and efficient manner. For economical reasons, the separation of alpha-olefin is preferably accomplished as part of an operation in which the high molecular weight aluminum trialkyls are oxidized to the corresponding aluminum trialkoxides and the latter are then converted to alcohols through hydrolysis. The task of separating alpha-olefins does not lend itself to the usual fractionation treatment, because at the temperatures which are employed for such treatment, an undue amount of degradation of aluminum trialkyl to alpha-olefins occurs. Other techniques have been suggested but for one reason or another they are not entirely satisfactory. As a result of a careful investigation, we have found that alpha-olefins can be separated in an economical and efficient manner by following the procedure of the present invention.

Accordingly, an object of this invention is to provide a method of separating high molecular weight alpha-olefins from liquid mixtures which also include aluminum trialkyls.

Another object of this invention is to provide a method of separating alpha-olefins from a growth product which also includes aluminum trialkyls.

Still another object of this invention is to provide a method of separating alpha-olefins from a liquid mixture which also contains aluminum trialkyl by means of a distillation technique.

Other objects and advantages of this invention will become apparent from the following description and explanation thereof, and from the sole figure, which is a schematic representation of one embodiment of the invention.

In accordance with the present invention, the method of separating alpha-olefins from liquid mixtures containing high molecular weight trialkyls involves spraying the liquid mixture under pressure into a separation zone which is maintained under a vacuum and at an elevated temperature so that one recovered fraction includes alpha-olefins and another includes the aluminum trialkyls.

More particularly, a high molecular weight alpha-olefin is separated from a liquid mixture which also includes high molecular weight trialkyls and an inert normally liquid hydrocarbon by spraying the liquid mixture into a separation zone wherein the pressure is about 0.5 to 760 mm. Hg absolute and the temperature is about 200 to 400° F., and thereby obtaining a fraction including alpha-olefins and inert hydrocarbon and another fraction including aluminum trialkyls. If desired, the separation of alpha-olefins from the aluminum trialkyls in the separation zone can be enhanced by the use of a gaseous hydrocarbon stripping material.

Turning now to the figure, a mixture of aluminum alkyl compounds and olefins which preferably results from the well-known growth reaction is passed by way of conduit 1 to a preheater 2, where it is heated to the desired temperature as described elsewhere herein. The heated mixture is then passed by way of conduit 3 to a separating zone 4. This zone 4 comprises a vacuum spray separator, with a suitable spray nozzle 5 through which the mixture is introduced. A stripping medium can be introduced by way of conduit 6 and valve 7 if desired. Pressure and temperature conditions are maintained in zone 4 so as to recover overhead by way of conduit 8 the olefins and also the growth reaction solvent when one is used, as well as the stripping medium when used. Aluminum alkyls bottoms product is recovered by way of conduit 9.

The growth reaction involves the reaction between a low molecular weight mono-olefin or alkylene such as ethylene, propylene, butene, etc., with a low molecular weight aluminum trialkyl, such as for example, an aluminum trialkyl having the alkyl substituents containing from about 2 to 4 carbon atoms. The resultant growth product comprises a trialkyl compound in which the alkyl groups vary widely in molecular weight. The growth reaction can be illustrated by the following equation:

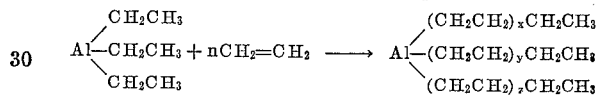

wherein $x$, $y$, and $z$ represent integers ranging from 0 to about 14 or higher and $x+y+z$ is equal to small "$n$."
The growth reaction can be carried out by passing the mono-olefin such as ethylene through trialkylaluminum such as triethylaluminum, preferably in the presence of a diluent under a variety of reaction conditions. The temperature of reaction can be from about 80° to 150° C. and at a pressure of about 200 to 5,000 p.s.i.g., and more usually a temperature of about 90° to 125° C. and at a pressure of about 1,000 to 3,500 p.s.i.g.

The growth reaction provides a statistical distribution of alkyl chain lengths characterized by the Poisson relationship, which can be expressed as follows:

$$P_{(n)} = \frac{m^n e^{-m}}{n}$$

wherein $P_{(n)}$ represents the probability that a certain hydrocarbon radical will be formed by "$n$" additions of ethylene to the aluminum ethyl bond originally present and $m$ is the mean number of additions of ethylene per growing chain. The following table contains an illustration of a type of distribution which is obtained in the growth reaction:

TABLE

| Alkyl group: | Weight percent |
|---|---|
| $C_2$ | 0.04 |
| $C_4$ | 0.23 |
| $C_6$ | 3.37 |
| $C_8$ | 11.79 |
| $C_{10}$ | 20.42 |
| $C_{12}$ | 22.63 |
| $C_{14}$ | 18.20 |
| $C_{16}$ | 11.61 |
| $C_{18}$ | 6.21 |
| $C_{20}$ | 3.47 |
| $C_{22}$ | 1.25 |
| $C_{24}$ | 0.49 |
| $C_{26}$ | 0.18 |
| $C_{28}$ | 0.05 |

The growth reaction may be carried out in a diluent which can be a paraffin, cycloparaffin or aromatic hydrocarbon such as for example, isooctane, cyclohexane, benzene, xylene, and the like. The diluent aids in controlling the temperature of the reaction which is exothermic and also serves as a solvent for the growth product.

As a result of the growth reaction, the growth product contains about 90 to 97 percent, more usually about 93 to 96 percent of aluminum trialkyls, based on the weight of the total product. On the other hand, if a solvent is employed in the growth reaction, the aluminum trialkyl may constitute about 65 to 85 percent, more usually about 70 to 75 percent by weight of the total product. The alpha-olefins may comprise from about 3 percent up to about 10 percent of the total product, although more usually, they may comprise about 4 to 7 percent by weight on the same basis.

For the purpose of the present invention, the diluent or solvent employed in the growth reaction is one which is suitable in the separation step where the alpha-olefins are recovered from the growth product containing aluminum trialkyls. For such a purpose, the solvent is a hydrocarbon which is inert under the conditions of separation. The inert normally liquid hydrocarbon may be a saturated aliphatic hydrocarbon or an aromatic hydrocarbon, as previously pointed out. While the boiling point of the hydrocarbon solvent may vary considerably, for the purpose of this invention, it is preferred to employ a hydrocarbon which boils at a temperature of about 300° to 320° F., when the aluminum trialkyls have alkyl substituents which average about 8 to 14 carbon atoms per substituent.

The liquid mixture including alpha-olefins and aluminum trialkyls are subjected to a separation treatment for the recovery of the alpha-olefins. When the inert hydrocarbon is also present, the separation treatment involves the removal of alpha-olefins and inert hydrocarbon from the aluminum compounds as a single fraction. The separation treatment is accomplished effectively by the technique of spray stripping. This involves spraying the liquid mixture or growth product into a suitable separation zone, such as a column and the like. In entering the column, the liquid mixture passes through a nozzle which causes the spray to form. The liquid mixture is introduced as a spray into the separation zone under an elevated nozzle pressure, for example, in the order of about 50 to 350 p.s.i.g., more usually about 100 to 150 p.s.i.g. In the column or separation zone, a vacuum of about 0.5 to 760 mm. Hg absolute is maintained. More usually, the vacuum in the separation zone is maintained at about 5 to 50 mm. Hg absolute. The separation zone is kept at a temperature of about 200° to 400° F., more usually about 200° to 350° F. It is also contemplated employing a stripping gas to facilitate the separation of the alpha-olefins from the aluminum trialkyls. A gaseous hydrocarbon material may be used as the stripping agent. The gaseous hydrocarbon material may be any saturated aliphatic hydrocarbon, which is either normally gaseous or may be rendered gaseous under the conditions employed in the separation zone. Specific examples of the stripping gas are natural gas, methane, ethane, propane, butane, isooctane, etc. The combination of the spray technique, a vacuum and a relatively low temperature for the separation treatment causes little or no harm to the aluminum trialkyl. The presence of aluminum trialkyl in the separation treatment makes it important to avoid high temperatures, because the aluminum trialkyl tends to decompose more readily at high temperatures.

After the alpha-olefins, with or without the inert hydrocarbon, is separated from the aluminum trialkyl, the aluminum compounds can be used for the preparation of alcohols or other chemical compounds, i.e., chlorides. If alcohols are desired, the aluminum compounds are oxidized with an oxygen containing gas, for example, air, oxygen, etc. The oxidation reaction takes place, with or without a solvent, which facilitates the reaction significantly. The solvent to be employed can be any one or more of the inert hydrocarbons specified hereinabove in connection with the growth reaction or the separation treatment. Unless, for economical reasons, it is preferred to use the same solvent in the oxidation treatment as was used for the growth reaction or the separation treatment, it is preferred to use a kerosene fraction having an A.S.T.M. initial boiling point of about 350° to 400° F. and an A.S.T.M. end point of about 500° to 520° F. The oxidation of aluminum compound with the oxygen containing gas takes place at a temperature of about 50° to 140° F., more usually about 70° to 120° F. The oxidation can be performed at atmospheric pressure or superatmospheric pressure. For the reaction, the pressure is geneally about 10 to 150 p.s.i.g. It is to be understood that the conditions of temperature, pressure and quantity of oxygen containing gas employed can be varied considerably and still be useful for the purposes of this invention.

Following the oxidation treatment, the solvent, if added, and the by-products of the oxidation step are removed; and the oxidation product is hydrolyzed to produce alcohols. For the hydrolytic reaction, the hydrolyzing agent is, for example, a mineral acid, e.g., sulfuric acid, etc. A basic material, such as, for example, sodium hydroxide, potassium hydroxide, and the like can also be used as the hydrolyzing agent. Hydrolysis can also be achieved through the use of water or steam; however dilute sulfuric acid is generally preferred as the hydrolyzing agent.

The following Example is presented in illustration of the invention:

*Example*

An aluminum alkyl growth product was prepared by reacting a solution of 20 pounds of aluminum triethyl and 20 pounds of isooctane solvent with ethylene in a batch reactor at 242° F. and 1,500 p.s.i.g. The growth product produced had the following composition:

| | Weight percent |
|---|---|
| Aluminum trialkyl | 76.39 |
| Olefins | 5.53 |
| Isooctane solvent | 18.08 |

The aluminum trialkyl and olefin fractions had the following molecular weight distributions:

| Chain Length | Weight Percent of Aluminum Alkyl | Weight Percent of Olefins |
|---|---|---|
| 2 | 0.94 | |
| 4 | 3.89 | |
| 6 | 8.65 | 0.27 |
| 8 | 15.65 | 5.04 |
| 10 | 19.21 | 27.11 |
| 12 | 18.08 | 32.47 |
| 14 | 13.69 | 16.43 |
| 16 | 8.83 | 8.60 |
| 18 | 4.75 | 5.81 |
| 20+ | 6.31 | 4.27 |
| | 100.00 | 100.00 |

The growth product was then pumped through a preheater where its temperature was raised to 212° F. This preheated feed then entered the top of a spray stripping chamber through a spray nozzle at a flow rate of 15 g.p.h.; nozzle pressure was maintained at 250 p.s.i.g. The pressure in the stripping chamber was maintained at a pressure of 33 mm. Hg absolute. As a result of the conditions prevailing in the stripping chamber, the solvent and the majority of olefins present were vaporized and removed overhead.

To further improve the recovery of olefins, the remaining growth product, removed from the bottom of this first chamber, was passed through a second stripping chamber. The feed was preheated to 235° F. in a preheater and pumped into the top of the stripping chamber through a nozzle as was done in the first stage. The feed rate to the second stage was 12 g.p.h.; nozzle pressure was held at 250 p.s.i.g., and the pressure in the chamber was maintained at 11 mm. Hg absolute. A flow of methane of 0.5 s.c.f.m. was introduced into the second chamber to aid the removal of the higher molecular weight olefins.

The overheads from both stripping chambers were combined and analyzed to determine percent recovery. These values were as follows:

| Olefin: | Percent recovered |
| --- | --- |
| $C_4$ | 100 |
| $C_6$ | 100 |
| $C_8$ | 98 |
| $C_{10}$ | 88 |
| $C_{12}$ | 66 |
| $C_{14}$ | 32 |
| $C_{16}$ | 5 |
| $C_{18}$ | 2 |
| $C_{20+}$ | 3 |

The olefins can be readily separated from the isooctane solvent by distillation and the isooctane solvent recycled to the growth reaction step. The stripped growth product is then available for further processing to produce alcohols or other desired chemicals.

Having thus described the invention by providing a specific example thereof, it is to be understood that no undue limitations or restrictions are to be drawn by reason thereof and that many variations and modifications are within the scope of the invention.

We claim:

1. In a process wherein an aluminum compound selected from the group consisting of the trialkyls and alkyl hydrides, which are subject to decomposition at elevated temperatures, said aluminum compounds having alkyl substituents containing about 1 to 4 carbon atoms is reacted with an alkylene containing about 2 to 4 carbon atoms in the presence of an inert liquid hydrocarbon vaporizable under the conditions prevailing in a subsequently-defined vacuum fractionation zone and selected from the group consisting of saturated aliphatic hydrocarbons and aromatic hydrocarbons to produce a reaction product including aluminum trialkyls, alpha-olefins and the inert hydrocarbon, the further steps comprising spraying the reaction product under pressure into a vacuum fractionation zone wherein the pressure is maintained at about 0.5 to below 760 mm. Hg absolute and the temperature is maintained at about 200° to 400° F., and additionally passing into said fractionation zone a stripping gas, such that an overhead fraction including alpha-olefins and inert hydrocarbons is produced and a bottom product concentrated in aluminum trialkyls is produced, withdrawing an overhead fraction including alpha-olefins and inert hydrocarbons from said fractionation zone, and withdrawing a bottom product concentrated in aluminum trialkyls from said fractionation zone.

2. In a process where an aluminum compound selected from the group consisting of the trialkyls and alkyl hydrides, which are subject to decomposition at elevated temperatures, said aluminum compounds having alkyl substituents containing about 1 to 4 carbon atoms, is reacted with an alkylene containing about 2 to 4 carbon atoms in the presence of an inert liquid hydrocarbon vaporizable under the conditions prevailing in a subsequently-defined vacuum fractionation zone and selected from the group consisting of saturated aliphatic hydrocarbons and aromatic hydrocarbons to produce a reaction product including aluminum trialkyls having alkyl substituents containing 2 to about 30 carbon atoms, alpha-olefins containing 2 to about 30 carbon atoms per molecule, and the inert hydrocarbons, the further steps comprising spraying the reaction product under a pressure of about 100 to 150 p.s.i.g. into a vacuum fractionation zone wherein the pressure is maintained at about 5 to 50 mm. Hg absolute and the temperature at about 200° to 300° F., additionally passing into said fractionation zone a stripping gas, and producing an overhead fraction including alpha-olefins and inert hydrocarbons and a bottom product concentrated in aluminum trialkyls.

3. In a process wherein an aluminum compound selected from the group consisting of the trialkyls and alkyl hydrides, which are subject to decomposition at elevated temperatures, said aluminum compounds having alkyl substituents containing about 1 to 4 carbon atoms is reacted with an alkylene containing about 2 to 4 carbon atoms in the presence of an inert liquid hydrocarbon vaporizable under the conditions prevailing in a subsequently-defined vacuum fractionation zone and selected from the group consisting of saturated aliphatic hydrocarbons and aromatic hydrocarbons to produce a reaction product including aluminum trialkyls, alpha-olefins and the inert hydrocarbon, the further steps comprising spraying the reaction product under pressure into a vacuum fractionation zone wherein the pressure is maintained at about 0.5 to below 760 mm. Hg absolute and the temperature is maintained at about 200° to 400° F., and additionally passing into said fractionation zone a stripping medium selected from the group consisting of natural gas, methane, ethane, propane, butane and isooctane, such that an overhead fraction including alpha-olefins and inert hydrocarbons is produced and a bottom product concentrated in aluminum trialkyls is produced, withdrawing an overhead fraction including alpha-olefins and inert hydrocarbons from said fractionation zone, and withdrawing a bottom product concentrated in aluminum trialkyls from said fractionation zone.

4. In a process where an aluminum compound selected from the group consisting of the trialkyls and alkyl hydrides, which are subject to decomposition at elevated temperatures, said aluminum compounds having alkyl substituents containing about 1 to 4 carbon atoms, is reacted with an alkylene containing about 2 to 4 carbon atoms in the presence of an inert liquid hydrocarbon vaporizable under the conditions prevailing in a subsequently-defined vacuum fractionation zone and selected from the group consisting of saturated aliphatic hydrocarbons and aromatic hydrocarbons to produce a reaction product including aluminum trialkyls having alkyl substituents containing 2 to about 30 carbon atoms, alpha-olefins containing 2 to about 30 carbon atoms per molecule, and the inert hydrocarbons, the further steps comprising spraying the reaction product under a pressure of about 100 to 150 p.s.i.g. into a vacuum fractionation zone wherein the pressure is maintained at about 5 to 50 mm. Hg absolute and the temperature at about 200° to 300° F., additionally passing into said fractionation zone a stripping medium selected from the group consisting of natural gas, methane, ethane, propane, butane and isooctane, and producing an overhead fraction including alpha-olefins and inert hydrocarbon and a bottom product concentrated in aluminum trialkyls.

References Cited by the Examiner

UNITED STATES PATENTS

| 856,048 | 6/1907 | Gaillard | 202—64 X |
| 1,356,878 | 10/1920 | Newton | 202—64 X |
| 1,493,756 | 5/1924 | LaBour | 202—64 X |
| 2,451,668 | 10/1948 | Egger et al. | 202—53 X |
| 2,702,268 | 2/1955 | Egger et al. | 202—64 X |
| 2,826,598 | 5/1958 | Ziegler et al. | 260—448 |
| 2,863,896 | 12/1958 | Johnson | 260—448 |
| 2,904,509 | 9/1959 | Helmers | 202—53 X |
| 2,906,794 | 9/1959 | Aldridge et al. | 260—448 X |
| 2,982,763 | 5/1961 | McLeod | 159—48 X |
| 3,016,396 | 1/1962 | Irie et al. | 260—448 |
| 3,104,251 | 9/1963 | Foster et al. | 260—448 |

FOREIGN PATENTS

| 527,318 | 7/1956 | Canada. |

NORMAN YUDKOFF, *Primary Examiner.*